Jan. 6, 1942.   C. J. SCRANTON   2,269,042
HARVESTING MACHINE
Filed July 26, 1940

Inventor
C. J. Scranton
by
Attorney

Patented Jan. 6, 1942

2,269,042

UNITED STATES PATENT OFFICE 2,269,042

HARVESTING MACHINE

Charles J. Scranton, La Porte, Ind., assignor to Allis-Chalmers Manufacturing Company, Milwaukee, Wis., a corporation of Delaware Application July 26, 1940, Serial No. 347,603

10 Claims. (Cl. 56—122)

This invention relates in general to harvesting machines, and it has more particular relation to that class of harvesting machines generally known as harvester-threshers or combines, wherein a single machine is used for the combined operations of harvesting the standing grain or like crop and threshing the same during the passage of the machine through the field.

A satisfactory type of harvester-thresher which has recently come into extensive commercial use is one wherein the harvested grain is conveyed rearwardly from the harvesting mechanism in a direct line to a threshing mechanism of substantially the same length as the harvesting mechanism. This arrangement has distinct advantages in operation, particularly since it permits conveying and feeding of the grain from the harvesting mechanism to the threshing mechanism in a stream or blanket of substantially even thickness across the full width of the threshing mechanism, and thus insuring that the threshing operation is performed uniformly across substantially the full width of the threshing mechanism. In a harvester-thresher of this character, in order to provide for operating the machine at maximum efficiency under various conditions as to stalk length and grain yield, it is often practicable and desirable, particularly in a thin stand of grain, to cut a swath of a width somewhat wider than the length of the threshing cylinder, while still preserving the general idea of presenting the cut grain in a substantially even blanket across the full width of the threshing mechanism. Quite satisfactory results along this line have been attained in machines of this class wherein the sickle cuts a swath of a width up to approximately twelve percent greater than the width of the threshing cylinder. However, as attempts are made to increase the width of the swath to too great an extent, additional difficulties are encountered in causing the cut grain to be conveyed, in a blanket of substantially uniform thickness, to the threshing cylinder for treatment thereby and the discharge of the threshed material in a substantially even stream of the full width of the separating mechanism.

The present invention contemplates the provision of a harvesting machine, as of the harvester-thresher type, wherein a longitudinally traveling conveyer on a header platform of improved design may receive cut grain from and over the full length of a cutting sickle of a length somewhat greater than the width of the conveyer, and the latter conveys the cut grain rearwardly from the cutting sickle in a direct line to a threshing mechanism, whose width is substantially the same as that of the conveyer, across the full width thereof, the header platform being arranged to gradually convey cut grain received from a side portion of the cutting sickle extending laterally beyond the conveyer gradually into the stream of material upon the conveyer. An even distribution of the cut material across the full width of the threshing mechanism and its discharge therefrom in an even stream to a rearwardly located separating mechanism is preferably enhanced by a spiral, inclined or warped arrangement of the threshing bars of the threshing cylinder to provide for their working any excess thickness of the cut grain that may lie adjacent an edge or side thereof at which the cutting sickle is of extended length, toward the central portion of the threshing mechanism, and to more uniformly distribute the threshing load across the full width of the threshing cylinder and thus better insure the discharge of an even stream of threshed material across the full width of the separating mechanism.

It is an object of this invention to provide a harvesting machine of improved design and construction embodying a header platform having its forward crop receiving end of greater width than its rear crop-discharging end, and a rearwardly traveling conveyer for conveying the crop from a harvesting device, of a width greater than the width of the conveyer and positioned at the forward end of the header platform, directly to a rotatable crop treating cylinder of a width equal to that of the conveyer.

It is a further object of this invention to provide a harvesting machine of the above character wherein the header platform is provided with an improved arrangement for facilitating the conveyance of material deposited on a forward side edge portion of the header platform laterally outside of the conveyer into the stream of material upon the conveyer.

It is a further object of the present invention to provide a harvester-thresher of the above character wherein the threshing mechanism includes a threshing cylinder having spaced peripheral threshing bars of extended length in the general direction of the axis of the cylinder and warped or inclined in a direction to facilitate working toward the central portion of the cylinder material fed to the cylinder from a side edge portion of the conveyer.

These and other objects and advantages are attained by the present invention, various novel features of which will be apparent from the description herein and the accompanying drawing, disclosing embodiments of the invention, and will be more particularly pointed out in the annexed claims.

Figure 1:
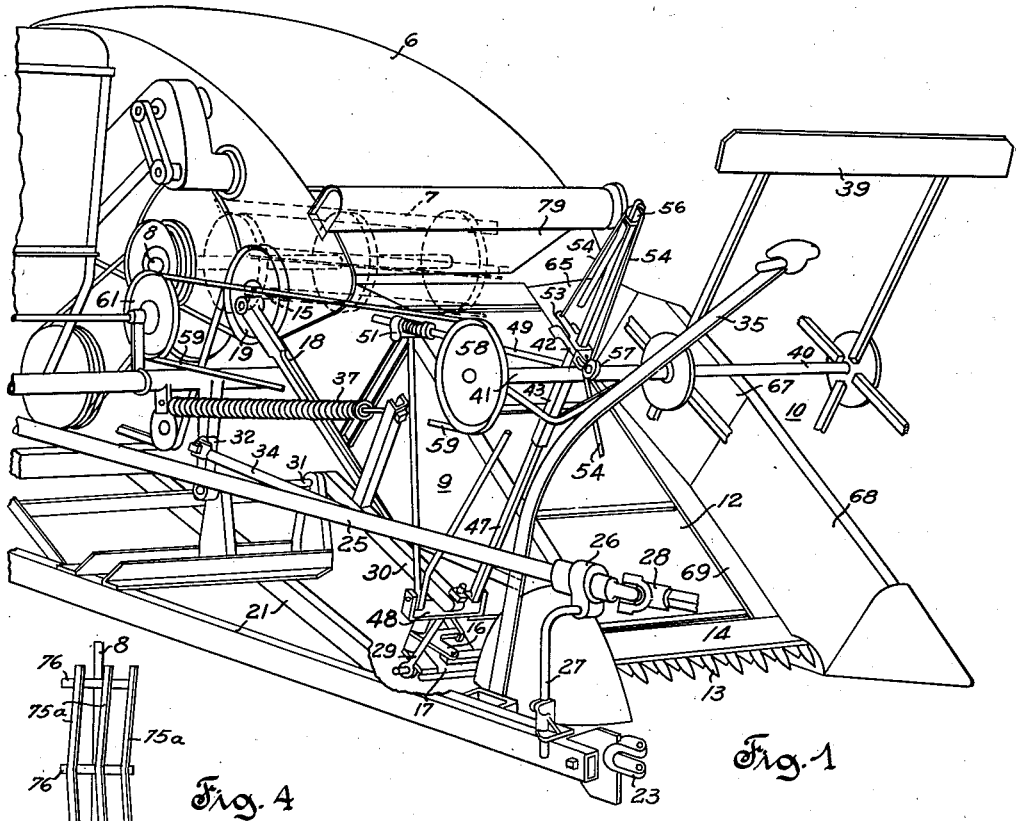
Fig. 1 is a perspective view of the forward portion of a harvester-thresher embodying features of the present invention.

In the drawing, there is disclosed a portion of a harvester-thresher including a housing 6 for the harvesting and threshing mechanism, the housing being mounted on a supporting structure which, as is customary, is mounted on supporting wheels. Within the forward portion of the housing 6, a threshing cylinder 7 is mounted on a shaft 8 rotatably supported in bearings mounted in the side walls of the housing.

A header platform comprising a supporting frame carrying a side wall 9 which, in the apparatus shown, is at the stubbleward side of the machine and a side wall 10 at the grainward side, and a bottom wall 11 between the two side walls. The header platform is pivotally mounted on the forward end of the housing 6, through a pivotal connection of the rear end portions of the side walls 9 and 10, the header platform at the rear end being of substantially the same width as the opening between the side walls of the housing 6 at the forward end thereof. The header platform carries an endless traveling conveyor 12 of the draper type, the upper side of this conveyor traveling upwardly and rearwardly from the lower forward portion of the platform at which a cutting sickle 13 and a stationary guard 14 therefor are mounted in conventional operative relation. The feed draper 12 is driven by a driving roller mounted on a shaft 15 rotatably mounted on the forward portion of the side walls of the housing 6, the axis of this shaft coinciding with the axis of the pivotal mounting of the header platform on the housing 6. The cutting sickle 13 is driven in reciprocating fashion from a bell crank lever 16 mounted on an extending portion of a supporting bracket 17 carried by the header platform; and the bell crank 16 is actuated by a pitman 18, the latter being operated by an eccentric connection to a sheave 19 on the shaft 15, this sheave serving to drive the shaft.

The wheeled supporting frame which carries the housing 6, with the header platform pivotally mounted thereon, includes a draft frame portion 21 extending forwardly at the right hand or stubbleward side of the machine. The forward end of the draft frame is provided with a bracket 23 for pivotal connection to the drawbar of a tractor, not shown. A drive shaft 25 for actuating the mechanism of the harvester-thresher has its forward end portion rotatably mounted in a bearing 26 supported on an adjustable pedestal 27 carried on the forward portion of the draft frame 21; and the forward end of this drive shaft is arranged for connection, through a universal coupling 28, to a power takeoff shaft on the tractor.

The header platform is maintained in desired operative position of adjustment relative to the ground through a link connection, indicated at 29, from a portion of the bracket 17 to the forward end of an arm 30 carried by a shaft 31 pivotally mounted on the draft frame 21 and having an arm 32 thereon connected by a rod 34 to an adjusting lever 35 pivotally mounted at its lower end on the draft frame 21 and having its upper end in a position within convenient reach of the operator on the seat of the tractor, and being provided with a conventional form of detent arrangement for holding the lever in its several positions of adjustment, to maintain the forward end of the header platform at a suitable distance above the ground. The weight of the header platform is counterbalanced to a desired degree by a tension spring 37 connected at its forward end to a projection on the pivoted arm 30 and at its rear end to a part of the supporting frame of the harvester-thresher.

A gathering reel 39 has its shaft 40 rotatably supported in an extended bearing 41 carried by a bracket 42. This bearing bracket includes a sleeve portion 43, preferably of rectangular cross-section, having a relatively close sliding fit over a reel post 47 of rectangular cross-section, the latter being pivotally mounted at its lower end on a bracket 48 attached to the header platform, so that the post is permitted to swing in a vertical plane longitudinally of the machine. The reel post is maintained in desired position by a bracing rod 49 attached to the body of the bearing bracket 42, or the sleeve portion 43 thereof, and supported at its rear end, preferably in an adjustable manner, by a bracket 51 mounted on the side wall of the header platform.

The bearing bracket 42 and the reel shaft carried thereby are held in desired position of adjustment on the reel post by a detent 53 pivotally mounted on the bracket and having a portion biased to holding engagement with different portions along the reel post. The bearing bracket and the reel may be adjusted to different positions with respect to the forward end of the header platform, through pull on a flexible actuating cord 54 attached to the pivoted detent 53 and passing about a guide sheave 56 mounted on the top of the reel post and a guide sheave 57 adjustably mounted at the forward side of the bracket 48, the cord thence passing to a convenient point for actuation by the operator of the tractor. The reel shaft is driven through a sheave 58 thereon and a driving belt 59 from a sheave 61 operatively mounted on the supporting structure of the machine, the axis of the driving sheave 61 being preferably in substantial alinement with the axis of the pivotal mounting of the header platform on the forward end of the housing 6.

The side wall 9 of the header platform extends upwardly from and at substantially right angles to the bottom wall 11 of the header and extends generally in a single plane, except for a rounded upper edge over the major portion of the length of this wall. The side wall 10 at the grainward side of the header extends upwardly at substantially right angles from the bottom wall 11 of the header platform, and it includes a rear section 65 parallel to the side wall 9 and entering the forward portion of the housing 6 on which this side wall is pivotally mounted, an intermediate section 67 inclined or flared outwardly in a forward direction from the rear section 65, and a forward section 68 substantially parallel to the side wall 9 and the rear section 65 of the side wall 10.

The forward section 68 and the intermediate outwardly flaring section 67 of the side wall 10 are provided with a plain flat shelf or ledge 69 extending substantially at right angles to the upwardly extending body portions of these sections and substantially parallel to the bottom wall 11, and disposed substantially even with or only slightly higher than the upper surface of the upper course of the feed draper 12, so that such shelf or ledge may be considered as lying approximately in the same plane as the conveying surface of the feed draper. As shown, the width of the forward portion of the ledge 69 is approximately ten percent of the width of the feed draper; and the cutting sickle 13 and its guard extend laterally across the full width of the forward position of the ledge 69. At the laterally inner edge of the ledge 69 throughout its length is a vertically extending wall portion 71 at right angles to and merging into or connected with the bottom wall 11 of the header platform. This ledge 69, with the vertical wall 71 at its inner edge, may be formed by having the intermediate flaring section 67 and the forward section 68 of the side wall 10 of full vertical height, and united at the lower end of such sections to the outer edge of a bottom wall 11 of the header platform which extends laterally beyond the feed draper; and a filler piece of tubular, channel or angle cross-section may be inserted on the lateral extension of the bottom wall 11, with the vertical wall portion 71 arranged as a forward prolongation of the lower part of the rear section 65 of the side wall, and secured in position on the bottom wall, with the shelf or ledge portion 69 extending substantially parallel to the bottom wall 11 and secured along the outer edge to the vertical forward section 68 and the intermediate flared section 67 of the side wall.

The threshing cylinder is of a width, in the direction of its axis, substantially the same as the width of the feed draper 12 and the discharge end of the header platform; and the threshing cylinder is made up of a series of circumfertially spaced and parallel threshing bars 75 extending in the general direction of the axis of the cylinder, but being inclined or spiraled at a slight angle to the direction of the cylinder axis, these threshing bars being mounted on a plurality of disks 76 carried by the shaft 8 of the cylinder. The threshing cylinder is arranged in conventional operative association with a concave, preferably of the imperforate type, disposed at the lower side of the cylinder; and the driving connection for the latter is such as effects rotation of the cylinder in a direction to move the threshing bars at the forward side of the cylinder downwardly and rearwardly across the concave, so as to draw the cut grain, fed to the cylinder by the draper 12 and an upper auxiliary feed draper 79, downwardly and rearwardly across the concave, and thus effect threshing thereof and discharge to the separating mechanism 78 of the machine.

The direction and degree of spiraling or inclination of the threshing bars on their support is such that the grainward ends of the bars pass a given horizontal plane through the cylinder substantially ahead of the stubbleward ends of these bars, and hence come into contact with the material to be threshed ahead of the stubbleward ends of the bars. Through this arrangement, the threshing bars are effective not only to perform the threshing operation, but also, through such inclination or spiraling of the bars, to move or shift a portion of the straw or stalks from the grainward side laterally to some extent toward the stubbleward side of the threshing cylinder during the threshing operation thereof. This effect is of considerable utility in causing any excess thickness of the stream or blanket of material fed by the draper 12 at the grainward side thereof, adjacent the ledge 69, to be shifted laterally toward the center of the threshing mechanism during the threshing operation, as well as producing a more uniform distribution of the threshing load on the cylinder.

During the normal operation of the harvester-thresher disclosed herein, the machine is drawn through the field by a tractor through the connection of the bracket 23 to the drawbar of the tractor, and with the drive shaft 25 connected, through the coupling 28, to a power takeoff connection from the tractor engine. Through the drive shaft 25, power is supplied through heretofore well known forms of driving connections to the shaft 8 of the threshing cylinder and through the sheave 19 on the shaft 15 of the driving roller of the feed draper 12, the eccentric connection of the pitman 18 to the sheave 19 serving to drive the sickle 13.

During the forward travel of the apparatus through the field, the crop is harvested by the reel and cutting sickle in a swath of a width equal to the active cutting length of the sickle and substantially equal to the distance between the forward ends of the side walls 9 and 10 of the header platform. The material cut in front of the feed draper 12 by the cutting sickle 13 is deposited or falls rearwardly therefrom onto the feed draper and is conveyed rearwardly by the latter in a normal manner; and the material cut in front of the ledge 69 by the cutting sickle is deposited or falls rearwardly therefrom onto the ledge. As the stalks on the feed draper are moved rearwardly, the frictional engagement of the stalks on the grainward edge of the draper with stalks on the ledge, cause the latter to be dragged rearwardly along the ledge. And any material remaining on the ledge 45 up to the rear end of the forward section 43 of the side wall 10 is then gradually crowded over, through engagement with the flaring wall section 67, toward and onto the adjacent side of the draper and moved rearwardly thereon. As the material moves rearwardly along the rear section 41 of the side wall 10, all of the material is now upon the feed draper; and this material on the draper, which is of substantially the same width as the threshing cylinder, is fed in a stream or blanket of a width equal to the width of the cylinder, and the latter acts thereon to draw or force the material between the threshing bars and the concave and discharge the threshed grain and stalks onto the rearwardly located separating mechanism 78.

Due to the spiral or inclined arrangement of the threshing bars, the material, as it passes into and through the threshing mechanism, is forced or carried by such bars toward the stubbleward side of the cylinder, and this action insures that any excess thickness of the material fed to the grainward side of the cylinder, incident to the pulling over onto the feed draper of material cut by the extended length of the sickle in front of the ledge 69, is distributed sidewise as it passes through the threshing mechanism, thus insuring a more uniformly distributed load on the threshing mechanism and a more nearly uniform discharge from the threshing cylinder, across the full width thereof, to the separating mechanism.

While in the embodiment of the invention disclosed in the drawing, the excess width of the swath cut by the harvester-thresher over the width of the feed draper is at the grainward side of the header, it will be apparent that such excess width may be at the stubbleward side, in which event the side wall 9 may be of the special formation, including an intermediate flaring section and a flat ledge like the section 67 and the ledge 69, respectively, of the side wall 10, and with the excess length of the cutting sickle in front of such a ledge on the side wall 9. With a header and cutting sickle arrangement of this character, it is desirable, for reasons which will be apparent in connection with the description hereinabove as to the operating effect of the spiral or inclined threshing bars of Figs. 1 and 2, that the threshing bars be inclined or spiraled in an opposite sense to that indicated in Figs. 1 and 2, so as to effect movement of the material handled by the threshing cylinder toward the grainward side of the threshing mechanism and separating mechanism in the rear thereof.

Where it is desired, the excess width of the swath over the width of the feed draper and threshing cylinder, instead of being wholly at one side of the header, may be distributed so as to have part of such excess width at both the grainward and stubbleward sides. With such an arrangement, both the grainward and stubbleward side walls of the header platform will have a similar outwardly flared formation to provide any desired reasonable excess width at the sides of the header; and each of the side walls would have its flat ledge, corresponding to the ledge 69 of Figs. 1 and 2, associated therewith laterally beyond the side edge of the feed draper and in the rear of the corresponding excess length portion of the cutting sickle. The action of such a header and its feed draper in forcing onto the feed draper material cut by the excess length portions of the cutting sickle in front of the ledges, and the presentation to the threshing mechanism of all of the material cut, in the form of a stream or blanket of the full width of the draper and threshing cylinder, will be apparent from the description hereinabove.

Figures 2, 4:
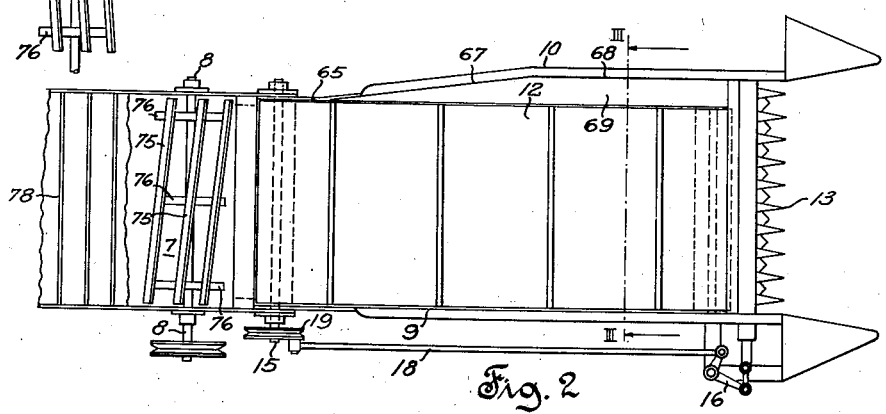
Fig. 2 is a plan view, with parts removed, of a portion of the apparatus shown in Fig. 1.
Fig. 4 is a plan view of a modified form of a detail shown in Figs. 1 and 2.
Figure 3:
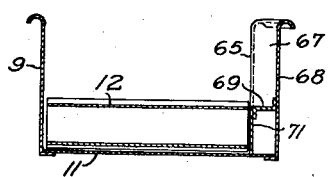
Fig. 3 is a sectional view in the plane of the line III—III of Fig. 2.

With an arrangement of this latter character where the cutting sickle is of excess length at both sides of the sickle, it is desirable to use a threshing cylinder wherein the threshing bars have a double spiral or inclined effect, as indicated in Fig. 4, wherein the threshing bars 75ª are inclined or spiraled in one direction at one side of the center of the cylinder and in an opposite direction at the other side of the center. In the operation of apparatus of this character, the threshing cylinder forces a portion of the material fed thereto adjacent each side of the cylinder to distribute itself toward and emerge from the cylinder at a point nearer the center thereof, so as to distribute the threshing load more uniformly and cause the threshed material to be discharged more uniformly across the full width of the cylinder.

It will be apparent that through the use of the present invention, with the crop receiving platform of the general character described hereinabove, to receive material at its forward end of a width greater than the width of its rear or discharge end and the conveyor carried by the platform, the material deposited at the side portion or portions of extended width is worked gradually in with the body of material on the feed draper, without any precipitous tumbling of such material onto the body of material on the draper, and the material is fed from the rear end of the conveyer to the crop treating mechanism in a stream or blanket of substantially uniform thickness and of a width substantially equal to the width of the treating mechanism. And through the use of a crop treating mechanism wherein the bars are spiraled or inclined in a particular manner, dependent upon which of the sides of the forward end of the platform are of extended width with respect to the feed draper, greater assurance is afforded toward uniform distribution of the load on the crop treating mechanism and uniform discharge of material therefrom, throughout the full width thereof.

It should be understood that the invention claimed is not limited to the exact details of construction and design shown and described herein, for obvious modifications within the scope of the annexed claims will be apparent to persons skilled in the art.

It is claimed and desired to secure by Letters Patent:

1. In a machine of the class described, a wheel-supported housing, mechanism for treating grain or the like carried by said housing and comprising a rotatable, horizontally disposed cylinder, a header platform mounted at the forward side of said housing and having its rear end of substantially the same width as said cylinder and its forward end of greater width than said cylinder, said header platform including an endless traveling conveyer of a width substantially equal to the width of said cylinder and adapted to convey material from the forward end of the header platform rearwardly in a direct line to said cylinder, said header platform having side walls, a forward portion of one of said side walls being substantially vertical and displaced outwardly with respect to the rear portion of said wall and including a portion of gradual outward flare, and said wall including a flat ledge or shelf in approximately the same plane as the conveying surface of said conveyer and having its rear portion of gradually reducing width and extending inwardly from and at substantially right angles to the substantially vertical portion of said side wall into close proximity to the adjacent edge of said conveyer, and crop collecting means disposed at the forward end of said header platform extending parallel to the axis of said cylinder and operative to deposit cut grain or the like on the forward portion of said conveyer and said shelf associated with said side wall.

2. In a machine of the class described, a wheel-supported housing, mechanism for treating grain or the like carried by said housing and comprising a rotatable, horizontally disposed cylinder, a header platform mounted at the forward side of said housing and having its rear end of substantially the same width as said cylinder and its forward end of greater width than said cylinder, said header platform including an endless traveling conveyer of a width substantially equal to the width of said cylinder and adapted to convey material from the forward end of the header platform rearwardly in a direct line to said cylinder, guiding side walls on said header platform, one of said side walls having a portion displaced outwardly from the rear end of said side wall and a shelf or ledge of gradually reducing width toward its rear end for receiving material at the forward end of the header and on which said material is conveyed rearwardly and laterally toward said conveyer, and means disposed at the forward end of said header platform and operative to collect and deposit cut grain or the like on the forward portion of said conveyer and the receiving ledge of said side wall, said cylinder having spaced peripheral threshing bars extending in the general direction of but inclined slightly to the axis of the cylinder in a direction to cause said bars during normal operation of the cylinder to force toward the intermediate portion of the cylinder material fed thereto from that side of the conveyor adjacent said outwardly displaced side wall on said header platform.

3. In a machine of the class described, a wheel-supported housing, mechanism for treating grain or the like carried by said housing and comprising a rotatable, horizontally disposed cylinder, a header platform mounted at the forward side of said housing and having its rear end of substantially the same width as said cylinder and its forward end of greater width than said cylinder, said header platform carrying an endless traveling conveyer of a width substantially equal to the width of said cylinder and adapted to convey material from the forward end of said header platform rearwardly in a direct line to said cylinder, side walls on said header platform having substantially vertical guide portions, the guiding portion of one of said walls including a rear portion in close proximity to the adjacent edge of said conveyer and a forward portion displaced laterally from the adjacent edge of said conveyer and including an outwardly flaring portion, and a flat ledge or shelf of gradually reducing width toward its rear end and extending inwardly from and at substantially right angles to the laterally displaced portion of said side wall, said ledge having its upper surface in substantially the same plane as and extending inwardly into close proximity to the conveying surface of said conveyer, and crop-collecting means disposed at the forward end of said header platform and operative to collect and deposit cut grain or the like on the forward portion of said conveyer and said shelf associated with said side wall, said cylinder having spaced peripheral threshing elements extending in the general direction of the axis of said cylinder but inclined slightly from said axis in a direction to cause said threashing elements to force toward the intermediate portion of the cylinder material fed thereto from that side of the conveyer adjacent said crop receiving shelf on said header platform.

4. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from said housing, said header platform being wider at its forward end than at its rear end, an endless flexible conveyer carried by said header platform and operative to convey material from its forward end in a direct line to said cylinder, said conveyer being of substantially the same width as said threshing cylinder, said header platform being provided with an upwardly extending guiding side wall a portion of which is flared outwardly in a forward direction, and a flat shelf or ledge of a width at its forward edge substantially equal to the difference in width of the forward and rear ends of the platform and of gradually reducing width toward its rear end and extending laterally from said guiding side wall approximately in the plane of the conveying surface of said conveyer and into close proximity to the adjacent side edge thereof, and a crop-collecting device mounted at the forward end of said header platform and extending across substantially the full width thereof and operative to deposit cut grain or the like on said conveyer and said shelf portion of said side wall of the header platform.

5. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from said housing, said header platform being wider at its forward end than at its rear end, an endless flexible conveyer carried by said header platform and operative to convey material from its forward end in a direct line to said cylinder, said conveyer being of substantially the same width as said threshing cylinder, crop-harvesting mechanism of a length greater than the width of said conveyer and mounted at the forward end of said header platform and extending across substantially the full width thereof, a guiding side wall on said header platform having a portion flared outwardly in a forward direction and provided with a flat ledge or shelf approximately in the plane of the conveying surface of said conveyer and of extended width at its forward edge and of gradually reducing width toward its rear end and extending into close proximity to the adjacent side edge of said conveyer, said crop-harvesting mechanism being operative to deposit cut material on the forward portion of said conveyer and said ledge.

6. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from the housing, said header platform being wider at its forward end than at its rear end, an endless flexible conveyer carried by said header platform and operative to convey material to the rear end of said platform and discharge said material to said cylinder, said conveyer being of substantially the same width as said threshing cylinder, a harvesting mechanism of a length greater than the width of said conveyer and mounted at the forward end of said header platform and extending across substantially the full width thereof, a side wall on said header platform having a portion flared outwardly in a forward direction and a shelf or ledge associated with said flared portion and extending to the forward end of the header platform, the laterally inner edge of said ledge being substantially in the plane of the conveying surface of said conveyer, said cylinder being provided with spaced peripheral threshing elements inclined at an angle to the direction of the axis of the cylinder in a direction to cause said cylinder in normal operation to force toward the intermediate portion of the cylinder material fed thereto from said conveyer at the side thereof adjacent the outwardly flared side wall of the header platform.

7. In a harvester-thresher, a wheel-supported threshing and separating housing, a threshing cylinder rotatably mounted between the side walls of said housing, a header platform pivotally mounted on said housing in advance of said cylinder and extending forwardly from said housing, said header platform being wider at its forward end than at its rear end, an endless flexible traveling conveyer carried by said header platform and operative to convey material from the forward to the rear end of said platform and to discharge the material to said cylinder, said conveyer being of substantially the same width as said threshing cylinder, a crop harvesting mechanism mounted on the forward end of said header platform and extending across the full width thereof, a side wall on said header platform having a portion flared outwardly in a forward direction, said outwardly flared portion having a laterally inner edge portion in close proximity to the adjacent edge of the conveying surface of said conveyer, said harvesting mechanism being operative to deposit harvested material on the forward end of said conveyer and the adjacent portion of said flared side wall, and said cylinder being provided with spaced peripheral threshing bars having the portions thereof adjacent said flared side wall extending in the general direction of but slightly inclined from parallelism to the axis of said cylinder in a direction to cause said cylinder in its normal operation to force toward the intermediate portion of the cylinder material fed thereto from said conveyer at the side thereof adjacent the outwardly flared side wall of the header platform.

8. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from said housing, said header platform being wider at its forward end than at its rear end, an endless flexible traveling conveyer carried by said header platform and of substantially the same width as said threshing cylinder and operative to convey material from the forward to the rear end of said platform and discharge said material to said cylinder, a harvesting mechanism of a length greater than the width of said conveyer and mounted at the forward end of said header platform and extending across substantially the full width thereof, each side wall of said header platform having a portion thereof gradually flared outwardly in a forward direction, said outwardly flared portions each having a laterally inner edge portion in close proximity to the adjacent edge of and substantially in the plane of the conveying surface of said conveyer and extending from the forward edge of the side wall to the rear of the flared portion thereof, and said cylinder being provided with spaced peripheral threshing elements inclined from the direction of the axis of the cylinder in a direction to cause said cylinder in its normal operation to force toward the intermediate portion of the cylinder material fed thereto from said conveyer adjacent the side edges thereof.

9. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from said housing, said header platform being wider at its forward end than at its rear end, an endless flexible conveyer carried by said header platform and operative to convey material from the forward to the rear end of said platform and discharge the said material to said cylinder, said conveyer being of substantially the same width as said threshing cylinder, a harvesting mechanism of a length greater than the width of said conveyer and mounted at the forward end of said header platform and extending across substantially the full width thereof, said header platform having side walls a vertical portion of each of which is flared outwardly in a forward direction, and a flat shelf or ledge associated with the flared portion of said side wall and extending to the forward end of the header platform, said ledge being of extended width at its forward edge and of gradually reducing width toward its rear end and extending at substantially right angles from the vertical portion of said side wall and in substantially the plane of the conveying surface of said conveyer, with the inner edge of said ledge in close proximity to the adjacent edge of said conveyer, and said cylinder being provided with spaced peripheral threshing bars of extended length in directions oppositely inclined from the direction of the axis of said cylinder and in directions to cause said cylinder during normal operation to force toward the intermediate portion of the cylinder material fed thereto from said conveyer at the side edges thereof.

10. In a harvester-thresher, a wheel-supported threshing and separating housing, a threshing cylinder rotatably mounted between the side walls of said housing at the forward portion thereof, a header platform pivotally mounted on said housing in advance of said cylinder and extending forwardly from said housing, said header platform being wider at its forward end than at its rear end, an endless flexible conveyer carried by said header platform and operative to convey material from the forward to the rear end of said platform and discharge said material therefrom to said cylinder, said conveyer being of substantially the same width as said threshing cylinder, a crop-collecting and depositing device of a length greater than the width of said conveyer and mounted at the forward end of said header platform and extending across substantially the full width thereof, a side wall on said header platform having a portion flared outwardly in a forward direction and a flat shelf or ledge associated with the flared section of said side wall and extending forwardly to the front end of said header platform, said shelf being of extended width at its forward edge and of gradually reducing width toward its rear end and lying substantially in the plane of the conveying surface of said conveyer with the inner edge of said ledge in close proximity to the adjacent edge of said conveyer, said cylinder being provided with spaced peripheral threshing bars extending in a direction slightly inclined from the direction of the axis of said cylinder and in a direction to cause said bars during operation of the cylinder to force toward the intermediate portion of the cylinder material fed thereto from said conveyer at the side thereof adjacent the outwardly flared side wall of the header platform.

CHARLES J. SCRANTON.